(12) United States Patent
Balaji et al.

(10) Patent No.: US 7,700,188 B2
(45) Date of Patent: Apr. 20, 2010

(54) IN-MOLD LABELS AND USERS THEREOF

(75) Inventors: Ramabhadran Balaji, Painesville, OH (US); Mark Wisniewski, Mentor, OH (US)

(73) Assignee: Avery Dennison Corporation, Pasadena, CA (US)

( * ) Notice: Subject to any disclaimer, the term of this patent is extended or adjusted under 35 U.S.C. 154(b) by 1830 days.

(21) Appl. No.: 10/714,197

(22) Filed: Nov. 14, 2003

(65) Prior Publication Data
US 2004/0096612 A1    May 20, 2004

Related U.S. Application Data

(62) Division of application No. 08/789,292, filed on Jan. 28, 1997, now Pat. No. 6,726,969.

(51) Int. Cl.
B29D 22/00    (2006.01)
B29D 23/00    (2006.01)
B32B 1/08    (2006.01)

(52) U.S. Cl. ............. 428/349; 428/516; 428/35.7; 428/327; 428/337; 428/339; 264/509

(58) Field of Classification Search ......... 428/40.1, 428/354, 36.9, 35.7, 34.1, 220, 332, 515; 264/259, 275, 447; 222/109; 162/129; 1/40.1
See application file for complete search history.

(56) References Cited

U.S. PATENT DOCUMENTS

| | | | |
|---|---|---|---|
| 4,662,528 A | 5/1987 | Slat | 215/12 R |
| 4,837,075 A | 6/1989 | Dudley | 428/220 |
| 4,883,697 A | 11/1989 | Dornbusch et al. | 428/35.7 |
| 4,904,324 A | 2/1990 | Heider | 156/214 |
| 5,079,057 A | 1/1992 | Heider | 428/36.5 |
| 5,223,315 A | 6/1993 | Katsura et al. | 428/36.92 |
| 5,238,630 A | 8/1993 | Tung | 264/132 |
| 5,242,650 A | 9/1993 | Rackovan et al. | 264/509 |
| 5,266,377 A | 11/1993 | Kinoshita et al. | 428/141 |

(Continued)

FOREIGN PATENT DOCUMENTS

EP    0 787 581 A1    8/1997

(Continued)

OTHER PUBLICATIONS

International Search Report dated Oct. 8, 2002 for EP Application 98 90 3481.

*Primary Examiner*—Rena L Dye
*Assistant Examiner*—Ellen S Wood (57) ABSTRACT

This invention relates to an in-mold label comprising a core layer with a first and second surface and a heat seal layer on the first surface of the core layer, wherein the heat seal layer comprises a polyolefin, having a peak melt temperature of less than about 110° C. and where less than about 25% of the polyolefin melts at a temperature of less than 50° C. as measured by differential scanning calorimetry. The label may also contain a skin layer on the second surface of the core layer. The invention also relates to plastic substrates bonded to the label. In another aspect, the present invention also relates to a process for in-mold labeling and a process for preparing an in-mold label.

The labels and processes provide reduced amounts of one or more of the following: blisters, both before and after bonding, shrinkage, bagginess and gage bands.

20 Claims, 1 Drawing Sheet

U.S. PATENT DOCUMENTS

| | | | |
|---|---|---|---|
| 5,332,542 A | 7/1994 | Yamanaka et al. | 264/509 |
| 5,358,792 A | 10/1994 | Mehta et al. | |
| 5,374,459 A * | 12/1994 | Mumpower et al. | 428/36.7 |
| 5,405,667 A | 4/1995 | Heider | 428/36.5 |
| 5,427,727 A | 6/1995 | Tung | 264/211 |
| 5,435,963 A | 7/1995 | Rackovan et al. | 264/509 |
| 5,475,075 A | 12/1995 | Brant et al. | 526/348.3 |
| 5,530,054 A | 6/1996 | Tse et al. | 524/474 |
| 5,562,962 A | 10/1996 | Tung | 428/200 |
| 5,658,672 A | 8/1997 | Lenke et al. | 428/423.1 |
| 5,705,255 A | 1/1998 | Grazioli | 428/195 |
| 5,707,472 A | 1/1998 | Smith | 156/240 |
| 5,711,839 A | 1/1998 | Dronzek, Jr. | 156/277 |
| 5,733,615 A | 3/1998 | Rackovan et al. | 428/35.7 |
| 5,800,757 A | 9/1998 | Abrams et al. | 264/132 |
| 5,811,163 A * | 9/1998 | Ohno et al. | 428/35.7 |
| 5,925,208 A | 7/1999 | Dronzek, Jr. | 156/257 |
| 5,928,740 A * | 7/1999 | Wilhoit et al. | 428/34.9 |
| 5,995,527 A | 11/1999 | Ueta et al. | 372/45 |
| 6,001,208 A | 12/1999 | Kinoshita et al. | 156/245 |
| 6,004,682 A | 12/1999 | Rackovan et al. | 428/518 |
| 6,007,579 A | 12/1999 | Lipshitz et al. | 623/6 |
| 6,159,568 A | 12/2000 | Freedman et al. | 428/36.91 |
| 6,165,576 A | 12/2000 | Freedman et al. | 428/36.91 |
| 6,246,441 B1 | 6/2001 | Terakado et al. | 348/552 |
| 6,251,333 B1 | 6/2001 | Zheng et al. | 264/513 |
| 6,287,684 B1 | 9/2001 | Yamanaka et al. | 428/343 |
| 6,458,913 B1 | 10/2002 | Honigfort et al. | 528/196 |
| 6,569,276 B2 | 5/2003 | Anderson et al. | 156/229 |

FOREIGN PATENT DOCUMENTS

| | | |
|---|---|---|
| EP | 0 611 102 B1 | 12/1998 |
| EP | 0 623 463 B1 | 4/1999 |
| EP | 0 611 647 B1 | 9/1999 |
| EP | 0 695 630 B1 | 10/2001 |
| GB | 2 310 398 A | 8/1997 |
| JP | 60-31672 | 8/1994 |
| WO | 92/14784 | 9/1992 |
| WO | 96/21557 | 7/1996 |
| WO | 97/30903 | 8/1997 |

* cited by examiner

IN-MOLD LABELS AND USERS THEREOF

This application is a divisional of U.S. patent application Ser. No. 08/789,292 filed on Jan. 28, 1997, now U.S. Pat. No. 6,726,969 which is hereby incorporated herein by reference in its entirety.

TECHNICAL FIELD OF THE INVENTION

This invention relates to in-mold labels for plastic substrates. The invention provides labels which have reduced blistering. The invention also relates to plastic substrates containing the label and processes for applying the label and making the label.

BACKGROUND OF THE INVENTION

In-mold labeling has significant advantages over methods commonly used in the past to label plastic containers with polymeric labels. The most common of these previous methods involve the use of liner-carried pressure sensitive adhesive labels, or liner carried heat activatable adhesive labels. To produce the liner carried labels, a laminating step is performed to sandwich a layer of adhesive between a web of label stock and a web of silicone-coated paper which is to function as a carrier or release liner, the label stock is printed, the ink is dried by heating elements or ultraviolet radiation, separate labels are cut from the label stock by passing the combination through a rotary-die or flat-bed cutting station, and the matrix of waste or trim label stock surrounding the labels is stripped and discarded or recycled. Use of these types of methods results in high costs due to the use of a release liner, and the ecological difficulties in disposing of the liner and the trim.

In contrast, in-mold labeling avoids the use of any release liner or carrier. During in-mold labeling with polymeric labels, self-supported or free-film polymeric label stock is combined with heat-activatable adhesive, printed, die-cut and then arranged for deployment, as by being magazine-loaded as a series or stack of linerless labels, or by other means. The polymeric labels are then sequentially deployed on the molding surface of a blow mold to be bonded onto successive hot plastic substrates or containers. The blow molded parisons are expanded against the molding surface and the in-mold label which activates and bonds the heat-activatable adhesive to the blown plastic substrate or container.

When the in-mold label fails to form a bond with the plastic substrate, a blister may form. One of the main reasons for formation of the blister is that the heat seal layer did not activate completely or uniformly during the molding process. Another problem for in-mold labels is post-application blistering. This blister occurs when the heat seal layer bonds to the plastic substrate but fails to cool sufficiently fast enough to form a bond. The activation temperature of the heat seal layer affects the ability of the in-mold label to effectively bond with the plastic substrate.

Films for in-mold labels may be oriented or non-oriented. Films for in-mold labels may be stretched and oriented in a single or double direction. After stretching, the film is thermally set or annealed. If the film is not sufficiently annealed, some of the polymers of the label resume some of their original length. This reduction leads to shrinkage of the film label material. This shrinkage is a major contributor to gage bands and bagginess in the rolls of film material. Gage bands are formed from thickness irregularities in the film. As the film is stored on rolls, the thickness irregularities cause the roll to form what is referred to as gage bands. Bagginess is caused by relaxation of the polymers in the film upon storage. This relaxation leads to formation of "baggy" pockets or bagginess. The shrinkage of the material increases the effects of gage bands and bagginess. The defect makes the film unprintable and is thus a functional defect for in-mold labels.

It is desirable to obtain a label which solves one or more of the above problems. A label which is better bonding would have reduced blisters. Labels with reduced shrinkage and polymer relaxation would have reduced gage bands and bagginess. The usage of conventional polymers poses certain limitations on the manufacturability of in-mold label films. By nature, in-mold films have a layer of materials that activate under heat. However, these films need to be heated to stretch them and anneal them. The lowest melting fraction of the heat activated resin component determines the temperature of these process conditions, if the in-mold adhesive is applied prior to orientation as in coextruded film processes.

Conventional polymers have very broad molecular weight distributions, which means there will be fractions that have much lower melting points than the peak melting point. These fractions, called the low molecular weight tails, are significantly reduced in metallocene catalyzed polymers or in polymers which are distilled or fractionated to remove the low molecular weight tail. Hence polymers that have more ideal peak melting temperatures can be used, enhancing adhesive performance.

The low molecular weight tail mentioned above causes "plate-out" problems which require frequent down-times for cleaning up the machine. In "plate-out", the low molecular weight tail separates from the main fraction of the film under the high temperature, pressure and shear in processing and condenses on the metal surface of rollers, dies and metal rolls. This condensed material attracts dirt, dust and suspended additives in the formulation and causes surface contamination. Thus, as the plate-out builds up on the machine, the machine needs to be stopped and cleaned periodically. Polymers without the low molecular weight tail, such as those prepared using metallocene catalysts, greatly decrease this downtime, from about once every 3 hours to about once every 24 hours, improving economics, throughput, productivity and reducing waste from shutting down the processing line. The reduced plate out allows an oriented film to be annealed at a higher temperature, which reduces film shrinkage.

Similar to the low molecular weight tail, there is also a high molecular weight tail present in polymers. This tail has a melting point which is substantially higher than the peak fraction. In the in-mold labeling process, as the hot plastic substrate or container comes into contact with the adhesive, the high molecular weight tail requires higher temperatures to activate. This higher temperature results in (1) very high cycle times since high temperatures also need long cooling times, which decreases productivity, or (2) non-uniform activation of adhesive, which causes blisters. In practice, both problems are encountered. Use of polymers with little high molecular weight tail, such as those produced with metallocene catalysts, alleviates this problem by ensuring uniform activation of adhesive.

In the application of in-mold labels, after the hot substrate contacts and activates the adhesive on the label, the whole assembly is rapidly cooled down to as close to room temperature as possible. During this rapid cooling process, the low molecular weight tail also needs to harden fast enough to provide a bond of substantial strength. If not, the differences in shrinkage rates of the container and label will result in post-application blisters. Polymers with lower amounts of low molecular weight tails, such as those produced with metallocene catalysts greatly decrease this phenomenon.

As an example, an EVA based adhesive with a 80° C. peak melting point has a broad molecular weight distribution which means that there will be low molecular weight tail that softens around, for example, 60° C., and high molecular weight tail that softens around, for example 100° C. This means the film needs to be annealed around 60° C. but the labels need to be heated to at least 100° C. for uniform activation. For comparison, a metallocene catalyzed polyolefin, with a peak melting point of 80° C. and a narrow molecular weight distribution, has a low molecular weight tail which might have a softening point of 70° C. and a high molecular weight tail that might have a softening point of 90° C. This film can be annealed around 70° C., which gives the film better properties, such as lower shrinkage and improved thermal stability. In the in-mold label process, the high molecular weight tail needs to be heated to only 90° C., ensuring better activation.

SUMMARY OF THE INVENTION

This invention relates to an in-mold label comprising a core layer with a first and second surface and a heat seal layer on the first surface of the core layer, wherein the heat seal layer comprises a polyolefin, having a peak melt temperature of less than about 110° C. and wherein less than about 25% of polyolefin melts at a temperature of less than 50° C. as measured by differential scanning calorimetry. In one aspect, the invention includes polyolefins prepared with a metallocene catalyst. The label may also contain a printable skin layer on the second surface of the core layer. The invention also relates to plastic substrates bonded to the label.

In another aspect, the present invention also relates to a process for in-mold labeling comprising the steps of: forming a label comprising a core layer with a first and second surface and a heat seal layer on the first surface of the core layer, wherein the heat seal layer comprises a polyolefin, having a peak melt temperature of less than about 110° C. and wherein less than about 25% of polyolefin melts at a temperature of less than 50° C. as measured by differential scanning calorimetry; inserting the label into a mold for producing a plastic substrate with an inside and outside surface; and forming a plastic substrate in the mold with sufficient heat to bond the heat seal layer on the label to the outside surface of the plastic substrate. In another aspect, the invention relates to a process for preparing an in-mold label comprising the steps of coextruding a multi layer film comprising a core layer having a first and second surface and a heat seal layer on the first surface of the core layer and annealing the film at a temperature above 75° C. In another aspect, the film is stretched in one or two directions.

The labels and processes provide reduced amounts of one or more of the following: blisters, both before and after bonding, shrinkage, bagginess and gage bands.

DESCRIPTION OF THE PREFERRED EMBODIMENTS

As used in the claims and specification, peak melt temperatures and percentage of melting material is determined by differential scanning calorimetry. The test is performed on a TA Instrument model 912 Differential Scanning Calorimeter. The heating cycle is from −60° C. to 300° C. with a heating rate of 10° C./minute. The heat absorbed is measured and plotted as is known to those in the art. In one embodiment, the sample is taken through one cycle, then cooled and then taken through another heating cycle wherein the heat absorbed is measured again. This measurement is known as a remelt reading and is considered preferred. Shrinkage is determined by cutting a sample of film and placing the sample in a 99° C. oven for 15 minutes. After cooling the sample the dimension change is measured and reported as a percentage of the original dimensions. The labels of the present invention provide shrinkages of less than about 6%, to less than about 5%. Typically the shrink rate is about 3-4%.

As described above the in-mold label comprises a heat seal layer on a core layer. The heat seal layer is activated by heat to form a bond with a plastic substrate. The heat seal layer comprises a polyolefin having a peak melt temperature of less than about 110° C., or less than about 105° C., or less than about 100° C. Typically, the polyolefin has a peak melt temperature greater than about 70° C., or greater than about 80° C., or greater than about 88° C. The polyolefin typically has a density from about 0.85 to about 0.95, or from about 0.87 to about 0.92, or from about 0.88 to about 0.91 g/cm$^3$. The polyolefin is characterized as having a narrow molecular weight distribution, such as a Mw/Mn of less than about 3.5, or from about 1.5 to about 2.5, or from about 1.7 to about 2.3. The molecular weight distribution is determined as described in U.S. Pat. No. 5,387,620, whose disclosure to molecular weight distribution and polymers made using metallocene catalysts is hereby incorporated by reference.

In one embodiment, the polyolefin is prepared using a metallocene. The polyolefins and the processes for making the same are described in the following U.S. patents, which are hereby incorporated by reference for their disclosure of metallocene catalysts, polyolefins and processes for making polyolefins, U.S. Pat. Nos. 5,358,792; 5,462,809; 5,468,440; 5,475,075; and 5,530,054. In another embodiment, the polyolefin may be prepared by distilling or fractionating the polyolefin and removing the low molecular weight fractions as is known to those in the art. The polyolefin is typically present in the heat seal layer at a level from about 30% to about 100%, or from about 30% to about 90%, or from about 35% to about 85% by weight. In one embodiment, the polyolefin is present in an amount from about 40% up to about 99%, or from about 50% to about 95%, or from about 60% up to about 90% by weight. In another embodiment, the polyolefin is present in an amount from about 20% up to about 70% or from about 25% to about 60%, or from about 30% up to about 50% by weight. Here as well as elsewhere in the specification and claims, the range and ratio limits may be combined.

The polyolefin may be a homopolymer or a copolymer. The olefins which may be used to prepare the polyolefins include those having from about two to about ten, or from two to about eight, or from about two to about four carbon atoms. Examples of useful olefins include ethylene, propylene, butylene, methyl-pentene, hexene, octene, etc. In a preferred embodiment, the polyolefin is a homopolymer or copolymer derived of ethylene, propylene or butylene. In one embodiment, the polyolefin is an ethylene homopolymer or an ethylene copolymer. The copolymer is prepared from ethylene, propylene, or butylene and an olefin having from about 3 to about 100 or from about 4 to about 30 carbon atoms. In one embodiment, the olefin has from about three to about twelve, or from about four to about ten carbon atoms. In another embodiment, the olefin has from about 10 to about 100, or from about 12 to about 30 carbon atoms. In one embodiment, the olefin used to prepare the copolymer is an alpha-olefin.

Examples of useful olefins include propylene, butylene, pentene, 4-methyl-1-pentene, hexene, heptene, octene, nonene, decene, undecene, dodecene, tetradecene, hexadecene, octadecene, and docosene. Typically, the olefin is present in an amount from about 1% up to about 50%, or from about 5% to about 30%, or from about 7% up to about 25% by mole. Examples of copolymers of ethylene include ethylene/propylene copolymers, ethylene/butylene copolymers, ethylene/hexene copolymers, ethylene/octene copolymers and ethylene/dodecene copolymers of ethylene and olefins, such as alpha-olefins are disclosed in U.S. Pat. No. 5,475,075, issued to Brant et al, and U.S. Pat. No. 5,530,054, issued to Tse et al. These patents are incorporated by reference for their disclosure of ethylene olefins and processes for making the same.

The polyolefins are available commercially from Dow Chemical Company under the Tradename of AFFINITY and ATTANE polyolefins. These polyolefins are produced using a metallocene catalyzed process. Examples of the commercially available ethylene copolymers include ATTANE 4201 polyolefins (having octene as a comonomer in the density of 0.91 grams per g/cm$^3$); 4203 (using octene as a comonomer and having a density of 0.905 g/cm$^3$) and DOWLEX 2045 (having octene as a comonomer and the density of 0.92 g/cm$^3$); VLDMPE (having butene as a comonomer and a density of 0.906 g/cm$^3$). Examples of useful AFFINITY polymers include HF 1030 (2% octene); PF 1140 (14% octene); PL 1840 (9.5% octene); FM 1570 (7.5% octene); PL 1880 (12% octene); and SM 1250 (19% octene).

In another embodiment, the heat seal layer may contain a blend of (i) the above polyolefins and (ii) one or more film-forming polymers. Examples of the film forming polymers include polyolefins other than (i), polystyrene, polyethylene acrylic acid, polyethylene methacrylic acid, polyethylene acrylate ester, polyethylene methacrylate ester, polyethylene vinyl alcohol, polyethylene vinyl acetate, polyethylene vinyl chloride, polycarbonate, styrene maleic anhydride copolymer, styrene acrylonitrile polymer, acrylonitrile butadiene styrene polymer, nylon, polyurethane, polysulfone, polyvinylidene chloride, ionomers based on alkali metal or zinc salts of ethylene-methacrylic acid, polyacrylates, polymethacrylates, cellulosics, fluoroplastics, polyacrylonitriles, thermal polyesters and mixtures of two or more thereof. Further examples of the additional polymers include polyethylene, polypropylene, polybutylene, polyethylene methyl acrylic acid, polyethylene ethyl acrylate, metallocene catalyst catalyzed polyolefins, polystyrene, polypropylene, cyclic olefins, polyethylene methyl acrylate, acrylonitrile, butadiene styrene polymer, polyethylene vinyl alcohol, polyethylene vinyl acetate, nylon, polybutylene, polyurethane, polysulfone, polyvinylidene chloride, polycarbonate, polymethyl pentene, styrene maleic anhydride polymer, styrene acrylonitrile polymer, ionomers based on sodium or zinc salts of ethylene/methacrylic acid, polymethyl methacrylates, cellulosics, fluoroplastics, polyacrylonitriles, polybutylene terephthalate (PBT), polyethylene terephthalate (PET), thermoplastic polyesters and mixtures of two or more thereof. The blend preferably contains from about 1% to 80%, or preferably from about 5% to about 75%, or from about 10% to about 60% by weight of the additional polymers. Such a blended adhesive layer would have the advantages of combining the properties of the metallocene polyolefin with the throughput and processability of the other component. The other components may also be chosen such that the adhesive is more compatible with the substrate to which it is bonded, for example, polypropylene or polyethylene terephthalate containers.

The heat seal layer may contain an antiblock or an antistatic additive. The antiblock additives include natural silica, diatomaceous earth, synthetic silica, glass spheres, ceramic particles, etc. The antiblock additive may be added as a concentrate. An example of an antiblock concentrate is manufactured by A. Schulman Inc. of Akron, Ohio under the product name Polybatch F-20. The Polybatch F-20 is an antiblock concentrate containing 20 weight percent natural silica based in low density polyethylene, and is designed for use in polyethylene applications. Both the particle size and the dispersion of this antiblock concentrate has been optimized to offer effective coefficient of friction values when used in conjunction with standard slip concentrates. The Polybatch F-20 material has the following material properties (which are based on its technical data sheet): melt index of the carrier resin of 9+/−4 grams/10 minutes; melt index of concentrate of 7+/−3 grins/10 minutes; ash (percent natural silica) of 20+/−2 percent; moisture retention (Karl fisher @ 190° C.) of 1000 ppm maximum; and pellets per gram of 46+/−5. When the antiblock is present the antiblock is present in an amount from about 10,000 to about 60,000, or from about 20,000 to about 50,000, or from about 40,000 ppm.

The antistatic additives include an amine or an amide or a derivative of a fatty acid. The antistatic is incorporated in the adhesive-containing or base layer charge and uniformly blended therewith. The amount of antistatic used may be varied for particular formulations and processing conditions. Typically from about 0.5% to about 15%, or from about 2% to about 10%, or about 5% by weight of the antistatic additive is used. An example of antistatic additive is sold by Hoechst Celanese under product number El 956 and is of the type that when added in bulk blooms to the surface and dissipates electric charges by hydrophilic action which attracts extremely minute amounts of ambient moisture. Another antistatic additive is an antistatic concentrate manufactured by A. Schulman Inc. of Akron, Ohio and sold under the product name Polybatch VLA-55-SF. Polybatch VLA-55-SF is a specialty antistatic concentrate. The Polybatch VLA-55-SF material has the following material properties (which are based on its technical data sheet): melt index of the concentrate of 11-18 grams/10 minutes; and moisture retention (Karl Fisher 0 190° C.) of 1000 ppm minimum.

The heat seal layer is designed for and activated at temperatures known to those skilled in the art. While the heat seal layer may activate at temperatures below those specified for activation, the heat seal layer is designed to activate at certain temperatures based on the substrate material under normal in-mold labeling conditions. Preferably, the heat seal layer activates at temperatures between about 54° C. to about 100° C., more preferably the heat seal layer activates at temperatures between about 57° C. to about 80° C., and most preferably the heat seal layer activates at temperatures between about 62° C. to about 70° C.

In one embodiment, the heat seal layer is substantially free (contains less than 0.5%) of carrier resin. Applicants have discovered that the polyolefins of the present invention do not require a carrier resin as a diluent, as does polyethylene vinyl acetate. In another embodiment, the heat seal layer is substantially free (e.g. <1%) of wax. The heat seal layer, in another aspect, is substantially free (e.g. <1% by weight) of ethylene vinyl acetate copolymer.

The label of the present invention contains a core layer. The core layer may be a single layer or a multilayer structure. The core layer is prepared from meltable film-forming polymers which include, but are not limited to polyethylene, polypropylene, polybutylene, polyethylene methyl acrylic acid, polyethylene ethyl acrylate, metallocene catalyst catalyzed polyolefins, polystyrene, polypropylene, cyclic olefins, polyethylene methyl acrylate, acrylonitrile, butadiene styrene polymer, polyethylene vinyl alcohol, polyethylene vinyl acetate, nylon, polybutylene, polyurethane, polysulfone, polyvinylidene chloride, polycarbonate, polymethyl pentene, styrene maleic anhydride polymer, styrene acrylonitrile polymer, ionomers based on sodium or zinc salts of ethylene/methacrylic acid, polymethyl methacrylates, cellulosics, fluoroplastics, polyacrylonitriles, polybutylene terephthalate (PBT), polyethylene terephthalate (PET), thermoplastic polyesters and mixtures of two or more thereof.

In one embodiment, the core layer is composed of a polyolefin, such as low, medium, or high density: polyethylene, polypropylene or polybutylene or copolymers of ethylene, propylene or butylene with an olefin, such as those discussed above. The polyolefin may be prepared using a metallocene catalyst. The polyolefin may be prepared from a copolymer of propylene and an alpha olefin, such as those containing from about two to about ten carbon atoms, and including ethylene, butylene, hexene and octene. An example of a useful polypropylene copolymer is sold by Union Carbide Corporation of Houston, Tex., under the product number 5A97. The 5A97 product has the following characteristics: a melt flow index of 3.9 grams/10 minutes; a melting point of 162° C.; tensile strength at yield of 5350 psi; elongation at tensile yield of 8%; and a flexural modulus (1/a secant) of 230,000 psi. The propylene copolymers include random propylene copolymers which have from 3 to about 5% ethylene. An example of propylene copolymer includes a random copolymer polypropylene which is sold by Union Carbide Corporation of Houston, Tex., under the product name 6D20. The 6D20 random copolymer polypropylene has the following characteristics: a melt flow of 1.6-2.2 grams/10 minutes; a density of 0.890 grams/cc; a tensile yield strength of 3600 psi; a yield elongation of 14%; a flexural modulus (tangent) of 130,000 psi; a vicat softening temperature of 134° C.; and a melting temperature of 147° C. Another random copolymer polypropylene is 5E98 available from Union Carbide Corporation.

The core layer may include a titanium dioxide concentrate. The titanium dioxide concentrate is a blend of 50% polypropylene homopolymer and 50% titanium dioxide by weight. The concentrate is available in pellet form for convenience of addition to the extrusion feed. Typically the core layer is composed of about 40% to about 100%, or from about 50% to about 90%, or from about 60% to about 80% of polyolefin, such as random polypropylene copolymer. In one embodiment, the titanium concentrate is present in an amount from about 2% to about 30%, or from about 5% to about 25%, or from about 10% to about 20% by weight of the core layer. The core layer may also include an ethylene vinyl acetate copolymer. The ethylene vinyl acetate copolymer typically has from about 9% to about 25% vinyl acetate. An example of a useful ethylene-vinyl acetate copolymer is sold by Quantum Chemical Corp. under the designation UE 631-04. The UE 631-04 resin has a melt flow rate of 2.5 g/10 min. (ASTM 1238E), a density of 940 kg/m$^3$ and a vinyl acetate content of 19% by weight. Another useful ethylene vinyl acetate copolymer is sold by AT Plastics as trade designation 1231 (12% vinyl acetate).

Previously for an in-mold film to work without an adhesive, a highly cellular core with a low density and thermal conductivity is necessary to insulate the bonding layer sufficiently to melt it. In cases where the adhesive is made of conventional polymers, previously their heat requirements for activation may be high enough to necessitate a cellular structure in the core. The presence of a cellular structure in the core imposes constraints on the manufacturing process, decreasing productivity and efficiency. Also, cellular structure, by nature, makes the prospect of making a clear film impossible.

Use of the polyolefins of the present invention, such as those made with metallocene catalysts, removes the stringent thermal conductivity requirements as set forth in above mentioned prior art. The in-mold films can thus be made white or clear.

In one embodiment, the core may be voided. However, this will be for purposes of (i) increasing stiffness, (ii) increasing opacity, and (iii) decreasing material usage. Reduction of thermal conductivity is rendered irrelevant due to the superior adhesion obtained with metallocene catalyzed polymers.

In another embodiment, the core layer may include a calcium carbonate concentrate. The calcium carbonate concentrate is preferably used with a polyolefin homopolymer, such as a polypropylene homopolymer. The calcium carbonate concentrate is present in an amount from about 30% to about 85%, or from about 40% to about 80%, or from about 50% to about 70% by weight of the core layer. An example of a calcium carbonate concentrate is composed of polypropylene with 40 weight percent calcium carbonate mineral filler, the material has a melt index of 3.0 minimum to 6.0 maximum (ASTM D1238); ash of 40.0+/−2.0%, volatiles of 500 ppm max.; and a bulk density of 730+/−50 g/l. The calcium carbonate concentrate is sold by A. Schulman Inc. of Akron, Ohio under the product name Polybatch PF92D. The calcium carbonate concentrates are used to prepare voids in the core layer as is discussed below.

Voided films can be produced by the use of blowing agents in the polymer film materials, or by the orientation of an incompatible two phase system. More preferably, the film is produced by the orientation of an incompatible two phase system. Oriented incompatible two phase systems can either be uniaxially oriented or biaxially oriented. Most preferably, the film is uniaxially oriented.

While each of the layers of the film including the skins may contain voids, preferably, the skin layer and/or the heat seal layers contain essentially no voids. Essentially no voids preferably means that the skin layers contain less than about 10% by volume of voids, and more preferably less than about 3% by volume of voids. Preferably, one of the layers of the core contains voids, and more preferably the entire core contains voids.

In another embodiment, the core is not voided and is composed of polymers or blends of polymers, such that the core is optically transparent. Material for such core includes the polyolefins (i) and addition polymers (ii) described above.

The film can be manufactured by those processes known to those in the art such as casting, coating or extrusion. U.S. Pat. No. 5,186,782, issued to Freedman, and U.S. Pat. Nos. 5,242,650 and 5,435,963, both issued to Rackovan et al disclose films, labels and processes for making the same. These patents are hereby incorporated by reference. The films are, however, preferably manufactured by a polymer extrusion or coextrusion process. The extrudate or coextrudate of polymeric film materials is formed by simultaneous extrusion from a suitable known type of extrusion or coextrusion die, and in the case of the coextrudate the layers are adhered to each other in a permanently combined state to provide a unitary coextrudate. A tie layer can be used when the materials of the layer (or layers) of the core, or materials of the core and the skin layer (or layers) do not sufficiently adhere or bond to each other when they are extruded together. Preferably, the film is coextruded. Care, however, must be taken to prevent activation of the heat seal layer during the orientation and annealing process.

The cast or extruded film in the core layer (or layers) formed from the incompatible two phase system is then either biaxially or uniaxially oriented. The means for orienting the film includes but is not limited to cold stretching, hot stretching, compression rolling, hot compression rolling, and a blown extrusion process. Preferably the film is uniaxially oriented and/or preferably the material is hot stretched. If the film will have an application with further processing or service temperatures above room temperature, preferably the film is also heat set or annealed to provide for dimensional stability, i.e., to prevent shrinking, relaxing or any distortion of the film. Preferably, the film thickness is less than about 7 mils. More preferably, the film thickness is from about 2 mil to about 6 mil. Most preferably, the film thickness is from about 3 mil to about 5 mil.

For purposes of this invention, the preferable incompatible two phase systems for voiding can be either uniaxially or biaxially oriented. For purposes of this specification, uniaxial orientation means the film is oriented substantially in the direction of orientation and to a lesser degree in the relatively unoriented direction. This preferably means that the stiffness is the oriented direction (machine direction for extruded films) is greater than about 30 Gurley, and that the stiffness in the unoriented direction (cross direction for extruded films) is less than about 0.75 times the stiffness in the oriented direction. Still preferably the stiffness in the unoriented direction is less than about 0.6 times the stiffness in the oriented direction, more preferably less than about 0.5 times.

For an incompatible two phase system, the void initiating particle or phase material, as indicated above, should be, at least partially, incompatible with the core material, at least at the conditions of uniaxial orientation. Typical void initiating particles materials can be organic or inorganic. Examples of organic void initiating particles include but are not limited to polyamides; nylons; high density polyethylene; polyesters such as polyethylene terephthalate; acetals; polypropylene homopolymer; and acrylic resins. Examples of inorganic void initiating particles include but are not limited to solid and hollow preformed glass spheres, metal beads or spheres; ceramic particles; titanium dioxide; calcium carbonate; barium sulfate; chalk; silicon dioxide; and clay. The preferable inorganic void initiating particle materials are mica, clay and chalk; more preferable material is ceramic spheres; and the most preferable material is calcium carbonate. The preferred mean particle size of the void initiating particle or phase is from about 0.1 to about 12μ. The more preferred mean particle size of the void initiating particle or phase is from about 0.5μ to about 5μ. The most preferred mean particle size of the void initiating particle or phase is from about 1 to about 3μ.

As indicated above, certain low cost filler materials such as calcium carbonate can be used as void initiating particles. Therefore, the greater the amount of void initiating particle, the lower the cost of materials in the film. Preferably, the void initiating particles or phase is present in an amount greater than about 20 weight percent of the voided layer prior to orientation. More preferably, the void initiating particles or phase is present in an amount greater than about 25 weight percent of the voided layer prior to orientation. Most preferably, the void initiating particles or phase is present in an amount greater than about 30 weight percent of the voided layer prior to orientation.

The voided film layer is generally described as being a matrix material within which is located a strata of voids. From this it is to be understood that the voids create the matrix configuration. The term "strata" is intended to convey the understanding that there are a large number of voids creating the matrix and the voids are oriented so that the major dimension(s) of the void is preferably aligned in correspondence with the direction(s) of orientation of the polymeric film structure. After each void has been formed through the initiation of a particle, the particle may contribute little else to the system.

The selection of materials for the skin layer, heat seal layer, and core layer is dependent on the application of the film. The selection of materials for the voided layer or layers is further dependent on the void initiating particle or phase materials and on the process conditions necessary for creating the voids.

The core layer is also composed of a printable skin layer. The skin or print layer is developed for its appearance and printing characteristics. Materials for the skin or print layer for in-mold labels include but are not limited to the following film forming materials used alone or in combination such as polyethylene, metallocene catalyzed polyolefins, syndiotactic polystyrene, syndiotactic polypropylene, cyclic polyolefins, polyethylene methyl acrylic acid, polyethylene ethyl acrylate, polyethylene methyl acrylate, acrylonitrile butadiene styrene polymer, polyethylene vinyl alcohol, polyethylene vinyl acetate, nylon, polybutylene, polystyrene, polyurethane, polysulfone, polyvinylidene chloride, polypropylene, polycarbonate, polymethyl pentene, styrene maleic anhydride polymer, styrene acrylonitrile polymer, ionomers based on sodium or zinc salts of ethylene/methacrylic acid, polymethyl methacrylates, cellulosics, fluoroplastics, polyacrylonitriles, and thermoplastic polyesters. Preferably, polypropylene is used in the skin layer (or layers) and more preferably a mixture of ethylene vinyl acetate/polypropylene is used.

Figure 1:
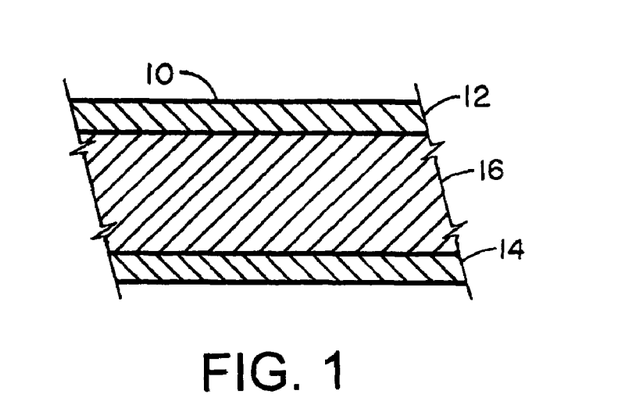
FIG. 1 is a cross sectional view of a label.
Figure 2:
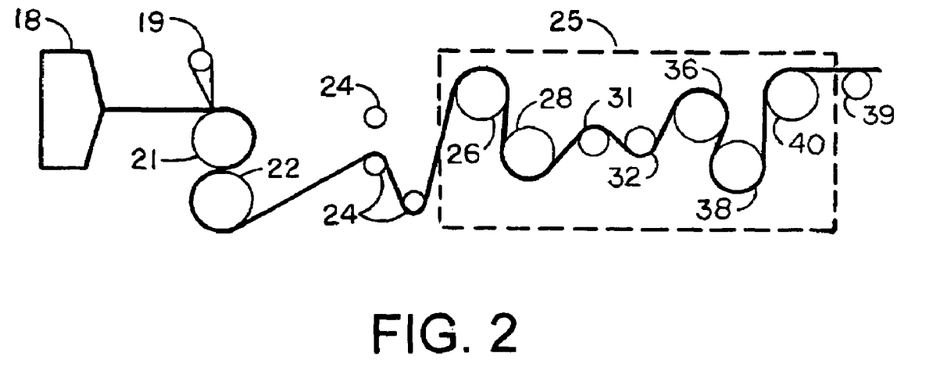
FIG. 2 is a representation of an embodiment of the method of preparing labels.

In one of the preferred embodiments, the film 10 shown in FIG. 1 is a coextrusion consisting of a core 16, a heat seal layer 12 and a skin layer 14. The charges for the several layers are prepared for extrusion through the multifeed coextrusion die 18 as illustrated in FIG. 2.

In this embodiment, the hot stretching is performed at a temperature equal to or above the softening temperature of the film and provides film orientation. During hot stretching the extrusion or coextrusion die is preferably maintained between from about 200° C. to about 230° C., and more preferably at about 220° C. The extruded film is cast onto a casting roll 21 which is preferably maintained between from about 20° C. to about 50° C., and more preferably at about 30° C., and is provided with an air knife 19. The film continues around the casting roll 21 and then passes to the chill roll 22 which is preferably maintained from about 20° C. to about 70° C., and more preferably at about 66° C. The film continues around the chill roll, trains through the rolls 24, and enters the uniaxial (or machine) direction orientation unit (MDO) 25. The film is preferably moved at a rate of between from about 20 to about 35 feet per minute past all these rolls, and more preferably at about 30 feet per minute.

Within the MDO unit, the film is stretched and stiffened in the machine direction. The film is passed around a first pre-heat roll 26 and then around a second pre-heat roll 28. These rolls are maintained at between from about 90° C. to about 120° C., or about 110° C., and from about 60° C. to about 100° C., or about 80° C., respectively, and at this point the film continues to move at between from about 20 to about 35 feet per minute, and more preferably at about 30 feet per minute. After leaving the second pre-heat roll the film tracks on the slow draw roll 31, maintained at a temperature from about 80° C. to about 120° C., or about 100° C., still preferably moving at between from about 20 to about 35 feet per minute, and more preferably moving at about 30 feet per minute. The film is then pulled to the fast draw roll 32, maintained at about 75°

C. to about 105° C., or about 85° C., which preferably advances the stock at the rate of between from about 120 to about 210 feet per minute, and more preferably at about 180 feet per minute. Therefore in this particular preferred embodiment described, the film is stretched sixfold and is drawn down preferably to about 20% of its original thickness. Stretch ratios are preferably from about 4:1 to about 10:1, and more preferably are from about 4:1 to about 6:1.

In this particular embodiment, the film continues on its way preferably at a rate between from about 120 to about 210 feet per minute, and more preferably at a rate of about 180 feet per minute. As it leaves the pull-roll pair 31, 32, the stretched film is subject to severe shrinkage if it is heated while under little or no mechanical constraint. The polymer film is said to have a "memory" of its original length to which it tends to return when heated. The film is cured or annealed to remove this tendency by applying heat to the tensioned film at the annealing rolls 36 and 38. Roll 36, in this embodiment, is preferably maintained between from about 115° C. to about 140° C., and more preferably at about 127° C. The roll 38 is preferably maintained at a temperature between from about 65° C. to about 120° C., and more preferably at about 85° C. The film then passes directly to the chill roll 40, which is maintained at a temperature from about 20° C. to about 40° C., or ambient temperature.

After leaving the chill roll 40 at the completion of the hot stretch operation, the film may be taken up as a self-wound roll 39. The roll 39 may be conveniently transported and stored.

The present invention further includes a process for in-mold labeling comprising the steps of forming a label comprising at least two layers with one layer being a heat seal layer for bonding the film to a plastic substrate wherein the film is described above; inserting the label into a mold for producing the plastic substrate with an inside and outside surface thereafter forming a plastic substrate in the mold with sufficient heat wherein the outside surface of the substrate bonds with the heat seal layer of the label.

The heat seal layer can be coated onto the core by conventional coating processes or preferably can be coextruded with the film in the form of a heat seal layer. Preferably, the heat seal layer is tailored to be heat sensitive. The film material is printed then die or laser cut. The printed and cut label is placed inside the mold cavity during the molding process for producing a plastic container with the adhesive side facing the outside surface of the hot plastic container. As the plastic is molded, the heat activates or melts the adhesive on the label, and the label and the plastic container form a permanent bond.

EXAMPLES

In order that persons in the art may better understand the practice of the present invention, the following Examples are provided by way of illustration, and not by way of limitation. Additional background information known in the art may be found in the references and patents cited herein, which are hereby incorporated by reference.

These examples are samples of film typically used as in-mold labels. For in-mold labeling this film would typically be converted into labels for application onto plastic containers during the process of forming these containers. Table 1 contains examples of formulations useful as heat seal layers. Table 2 contains examples of formulations useful as core layers. Table 3 contains examples of formulations useful as skin layers. Table 4 contains examples of two or three layer films where all the layers are produced by a coextrusion process.

Table 1 shows the composition of the heat seal layer by weight percent of components. The ethylene/octene copolymer is AFFINITY PF 1140, which has 14.0% octene, a melt index of 1.6 dg/min. and a density of 0.895 gm/cc. HPP is a homopolymer polypropylene sold by Union Carbide Corporation of Houston, Tex., under the product number 5A97. The 5A97 product has the following characteristics: a melt flow index of 3.9 grams/10 minutes; a melting point of 162° C.; tensile strength at yield of 5350 psi; elongation at tensile yield of 8%; and a flexural modulus (1/a secant) of 230,000 psi. The RnCoPP is a random copolymer polypropylene sold by Union Carbide Corporation of Houston, Tex., under the product name 6D20. The 6D20 random copolymer polypropylene has the following characteristics: a melt flow of 1.6-2.2 grams/10 minutes; a density of 0.890 grams/cc; a tensile yield strength of 3600 psi; a yield elongation of 14%; a flexural modulus (tangent) of 130,000 psi; a vicat softening temperature of 134° C.; and a melting temperature of 147° C. The $CaCO_3$ is a concentrate of the void initiating particle and HPP with the following characteristics: the composition is polypropylene with 40 weight percent calcium carbonate mineral filler, the material has a melt index of 3.0 minimum to 6.0 maximum (ASTM D1238); ash of 40.0+/−2.0%, volatiles of 500 ppm max.; and a bulk density of 730+/−50 g/l. The calcium carbonate concentration is sold by A. Schulman Inc. of Akron, Ohio under the product name Polybatch PF92D. EVA is ethylene vinyl acetate and is sold by Quantum Chemical Corporation of Cincinnati, Ohio under the product name Ultrathene UE 631-04. The EVA material is a material which promotes higher temperature performance as well as adhesion to a variety of substrates. Ultrathene UE 631-04 contains a stabilizing additive package and can also be used in compounded products where high filler loadings are required. The EVA material has the following properties: melt index 2.4 g/10 min.; tensile strength at break of 2150 psi; elongation at break of 710 percent; a 1% secant modulus of 5300 psi; a hardness (shore A) of 87; a ring & ball softening point of 174° C.; and a peak melting point of 86° C.

The antiblock concentrate is manufactured by A. Schulman Inc. of Akron, Ohio under the product name Polybatch F-20. The Polybatch F-20 is an antiblock concentrate containing 20 weight percent natural silica based in low density polyethylene, and is designed for use in polyethylene applications. Both the particle size and the dispersion of this antiblock have been optimized to offer effective coefficient of friction values when used in conjunction with standard slip concentrates. The Polybatch F-20 material has the following material properties (which are based on its technical data sheet): melt index of the carrier resin of 9+/−4 grams/10 minutes; melt index of concentrate of 7+/−3 grams/10 minutes; ash (percent natural silica) of 20+/−2 percent; moisture retention (Karl fisher @ 190° C.) of 1000 ppm maximum; and pellets per gram of 46+/−5. The antistatic concentrate is also manufactured by A. Schulman Inc. of Akron, Ohio under the product name Polybatch VLA-55-SF. Polybatch VLA-55-SF is a specialty antistatic concentrate. The Polybatch VLA-55-SF material has the following material properties (which are based on its technical data sheet): melt index of the concentrate of 11-18 grams/10 minutes; and moisture retention (Karl Fisher 0 190° C.) of 1000 ppm minimum.

The materials for the heat seal layer are melted and mixed in a 2½ inch extruder manufactured by Davis Standard of Pawcatuck, Conn. with a screw of a UD ratio of 24:1. The extruder contains six temperature zones which were maintained at 177, 205, 216, 222, 222, and 224° C., respectively.

The print skin layers of the three layer film are melted and mixed in a 2½ inch extruder equipped with a screw of a UD ratio of 24:1. This extruder is manufactured by Davis Standard of Pawcatuck, Conn. The extruder contains six temperature zones which where are maintained during melting and mixing at 177, 205, 222, 222, 227, and 227° C., respectively.

The cores of the films are melted and mixed in a 130 mm extruder equipped with a screw of a UD ratio of 34:1. This extruder was manufactured by Davis Standard of Pawcatuck, Conn. The extruder contains eight temperature zones which are maintained during melting and mixing at 196, 199, 202, 207, 210, 213, 216, and 227° C., respectively. The calcium carbonate of the core material is dried prior to mixing in an oven manufactured by Conair Franklin of Franklin, Pa. at 80° C. for four hours to insure that the concentrate material contains little or no moisture.

The three extruders feed a multilayer feedblock which then feeds a single manifold coathanger die. Both the feedblock, die and adapter pieces which connects the extruders, feedblock and die together are held at a constant temperature of 218° C. The three layer films are extruded onto a casting roll which is maintained at 30° C., and are provided with an air knife for further cooling the film and followed by a second cooling roll at 66° C. The film is then stretched uniaxially in the machine direction by being run through an orientation unit which orients the film in the machine direction (MD). The orientation unit consists of a number of rolls the first two of which are used for pre-heating the film prior to stretching. These rolls are maintained at 110° C. and 80° C., respectively so that a substantial portion of the thickness of the film is heated. The film is stretched between the slow draw roll, maintained at 100° C. (moving the film at 30 feet/minute) and a fast draw roll, maintained at 80° C., (moving the film at 180 feet/minute). All of the samples are stretched or drawn down to approximately 4 mils which is approximately 20 percent of the original thickness of the film as it is extruded onto the casting roll. The stretched uniaxially oriented film is then cured (or annealed) by applying heat to the tensioned film stock at an annealing station with two rolls. The annealing rolls are maintained at a temperature of 127° C. and 85° C. respectively. The film is then passed onto a chill roll maintained at a temperature of 20° C.

TABLE 1

(Heat Seal Layer)

| Example | Ethylene/octene copolymer | EVA | HPP | RnCopp | Anti-block | Anti-static |
|---|---|---|---|---|---|---|
| 1 | 100 | — | — | — | — | — |
| 2 | 90 | — | — | — | 10 | — |
| 3 | 80 | — | — | — | 20 | — |
| 4 | 80 | — | — | — | 17.5 | 2.5 |
| 5 | 60 | 25 | — | — | 13 | 2 |
| 6 | 72 | 8 | — | — | 17.5 | 2.5 |
| 7 | 40 | 40 | — | — | 20 | — |
| 8 | 65 | 15 | — | 10 | 7.5 | 2.5 |
| 9 | 50 | — | 30 | — | 17.5 | 2.5 |
| 10 | 70 | 10 | — | 15 | 5 | — |

TABLE 2

(Core Layer)

| Example | RncoPP | Ethylene/octene copolymer | EVA | HPP | Titanium Concentrate | Calcium Carbonate Concentrate |
|---|---|---|---|---|---|---|
| 1 | 100 | — | — | — | — | — |
| 2 | 80 | 5 | — | — | 15 | — |
| 3 | 85 | — | 5 | — | 10 | — |
| 4 | 75 | — | 10 | — | 15 | — |
| 5 | 70 | — | 15 | — | 15 | — |
| 6 | 55 | 25 | 10 | — | 10 | — |
| 7 | — | — | — | 10 | — | 90 |
| 8 | — | — | — | 40 | — | 60 |
| 9 | — | 10 | — | 40 | — | 50 |
| 10 | — | — | — | 20 | — | 80 |

TABLE 3

(Skin Layer)

| Example | HPP | Ethylene/octene copolymer | EVA |
|---|---|---|---|
| 1 | 40 | — | 60 |
| 2 | 50 | 10 | 40 |
| 3 | 50 | — | 50 |
| 4 | 30 | 20 | 50 |
| 5 | 30 | 30 | 40 |
| 6 | 100 | — | — |
| 7 | — | 50 | 50 |

Table 4 contains examples of multilayer films prepared as described above and which are useful as in mold labels. The examples combine the formulations from above.

TABLE 4

| | A | B | C | D | E | F | G | H |
|---|---|---|---|---|---|---|---|---|
| Skin Layer (Table 1) | | | | | | | | |
| Ex. 1 | X | — | — | — | — | — | — | — |
| Ex. 3 | — | X | — | — | — | X | — | X |
| Ex. 4 | — | — | X | X | — | — | — | — |
| Ex. 7 | — | — | — | — | X | — | X | — |
| Core Layer (Table 2) | | | | | | | | |
| Ex. 1 | X | — | — | — | — | X | X | — |
| Ex. 5 | — | X | — | X | — | — | — | — |
| Ex. 10 | — | — | X | — | X | — | — | X |
| Skin Layer (Table 3) | | | | | | | | |
| Ex. 1 | — | X | — | — | — | — | X | — |
| Ex. 3 | — | — | X | — | X | X | — | X |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. An in-mold label comprising a core layer with a first and second surface and a heat seal layer positioned on the first surface of the core layer, wherein the heat seal layer comprises a polyolefin comprising a copolymer of (a) ethylene, propylene or butylene, and (b) an olefin comonomer having from about 3 to about 10 carbon atoms and wherein (a) and (b) are different, wherein the polyolefin has a peak melt temperature of less than about 110° C. and wherein less than about 25% of polyolefin melts at a temperature of less than 50° C. as measured by differential scanning calorimetry.

2. The label of claim 1 wherein the polyolefin is prepared with a metallocene catalyst.

3. The label of claim 1 wherein the polyolefin has a Mw/Mn ratio less than about 3.5.

4. The label of claim 1 wherein the heat seal layer is a blend of the polyolefin and a film-forming polymer.

5. The label of claim 1 wherein the heat seal layer is a blend of (i) a polyolefin and (ii) one or more polymers selected from the group consisting of polyolefins other than (i), polystyrene, polyethylene acrylic acid, polyethylene methacrylic acid, polyethylene acrylate ester, polyethylene methacrylate ester, polyethylene vinyl alcohol, polyethylene vinyl acetate, polyethylene vinyl chloride, polycarbonate, styrene maleic anhydride copolymer, styrene acrylonitrile polymer, acrylonitrile butadiene styrene polymer, nylon, polyurethane, polysulfone, polyvinyl idene chloride, ionomers based on alkali metal or zinc salts of ethylene-methacrylic acid, polyacrylates, polymethacrylates, cellulosics, fluoroplastics, polyacrylonitriles and thermal polyesters.

6. The label of claim 1 wherein the heat seal layer is a blend of the polyolefin and ethylene vinyl acetate.

7. The label of claim 1 wherein the heat seal layer is substantially free of ethylene vinyl acetate.

8. The label of claim 1 wherein the heat seal layer contains less than 0.5% carrier resins.

9. The label of claim 1 wherein the label has a shrinkage of less than about 5%.

10. The label of claim 1 wherein the label has a thickness of less than about 7 mils.

11. The label of claim 1 further comprising a printable skin layer on the second surface of the core layer.

12. The label of claim 1 wherein the label is optically opaque.

13. The label of claim 1 wherein the label is optically transparent.

14. An in-mold label comprising a core layer with a first and second surface, a heat seal layer positioned on the first surface of the core layer, and a printable skin layer on the second surface of the core layer, wherein the heat seal layer comprises a polyolefin copolymer of (a) ethylene, propylene or butylene, and (b) an olefin comonomer having from about 3 to about 12 carbon atoms and wherein (a) and (b) are different, wherein said polyolefin has a peak melt temperature of less than about 110° C. and wherein less than about 25% of polyolefin melts at a temperature of less than 50° C. as measured by differential scanning calorimetry.

15. The label of claim 14 wherein the polyolefin is an ethylene copolymer derived from ethylene and one selected from the group consisting of propylene, butylene, pentene, 4-methyl-1-pentene, hexene, heptene, and octene.

16. The label of claim 14 wherein the polyolefin is prepared with a metallocene catalyst.

17. The label of claim 14 wherein the heat seal layer is a blend of (i) an ethylene copolymer and (ii) a film-forming polymer.

18. The label of claim 14 wherein the heat seal layer is a blend of (i) an ethylene copolymer and (ii) one or more polymers selected from the group consisting of polyolefins other than (i), polystyrene, polyethylene acrylic acid, polyethylene methacrylic acid, polyethylene acrylate ester, polyethylene methacrylate ester, polyethylene vinyl alcohol, polyethylene vinyl acetate, polyethylene vinyl chloride, polycarbonate, styrene maleic anhydride copolymer, styrene acrylonitrile polymer, acrylonitrile butadiene styrene polymer, nylon, polyurethane, polysulfone, polyvinylidene chloride, ionomers based on alkali metal or zinc salts of ethylene-methacrylic acid, polyacrylates, polymethacrylates, cellulosics, fluoroplastics, polyacrylonitriles and thermal polyesters.

19. The label of claim 14 wherein the heat seal layer is a blend of the polyolefin and ethylene vinyl acetate.

20. The label of claim 14 wherein the heat seal layer is substantially free of ethylene vinyl acetate.

* * * * *